United States Patent
Takeda et al.

(10) Patent No.: US 9,455,087 B2
(45) Date of Patent: Sep. 27, 2016

(54) DIELECTRIC FILM AND DIELECTRIC ELEMENT

(71) Applicant: TDK CORPORATION, Tokyo (JP)

(72) Inventors: Saori Takeda, Tokyo (JP); Masahito Furukawa, Tokyo (JP); Masanori Kosuda, Tokyo (JP); Yuji Sezai, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 14/833,614

(22) Filed: Aug. 24, 2015

(65) Prior Publication Data

US 2016/0079002 A1 Mar. 17, 2016

(30) Foreign Application Priority Data

Sep. 12, 2014 (JP) .................................. 2014-186458
Jun. 15, 2015 (JP) .................................. 2015-120079

(51) Int. Cl.
*C04B 35/00* (2006.01)
*H01G 4/10* (2006.01)
*H01G 4/33* (2006.01)
*H01G 4/12* (2006.01)
*H01G 4/20* (2006.01)

(52) U.S. Cl.
CPC .............. *H01G 4/10* (2013.01); *H01G 4/1227* (2013.01); *H01G 4/20* (2013.01); *H01G 4/33* (2013.01)

(58) Field of Classification Search
CPC ........................ C04B 35/468; C04B 35/4682
USPC ........................................ 501/137, 138, 139
See application file for complete search history.

(56) References Cited

U.S. PATENT DOCUMENTS

2010/0123370 A1* 5/2010 Yamaguchi ......... H01L 41/1878
310/365

FOREIGN PATENT DOCUMENTS

| JP | 2000-173349 A | 6/2000 | |
| JP | 2005-022890 A | 1/2005 | |
| JP | 2005022890 A | * 1/2005 | ............. C04B 35/46 |

* cited by examiner

*Primary Examiner* — Noah Wiese
(74) *Attorney, Agent, or Firm* — Oliff PLC

(57) ABSTRACT

A dielectric film contains as a main component a dielectric composition represented by the general formula $(Ba_{1-x}Ca_x)_z(Ti_{1-y}Zr_y)O_3$ wherein $0.001 \leq x \leq 0.400$, $0.001 \leq y \leq 0.400$, and $0.900 \leq z < 0.995$. In an X-ray diffraction pattern of the dielectric composition, the dielectric composition has the relation $0.00° \leq 2\theta_c - 2\theta_t < 0.20°$ between (001) plane diffraction peak position $2\theta_t$ of a tetragonal structure represented by the general formula and (100) plane diffraction peak position $2\theta_c$ of a cubic structure represented by the general formula.

8 Claims, 3 Drawing Sheets

DIELECTRIC FILM AND DIELECTRIC ELEMENT

BACKGROUND OF THE INVENTION

1. Field of the Invention

The present invention relates to a dielectric film and a dielectric element such as a thin-film capacitor, which includes the dielectric film.

2. Description of the Related Art

With multi-functionalization of electronic apparatuses, various functions are desired to be added to electronic circuit boards contained in electronic apparatuses. Therefore, the number of electronic components mounted on an electronic circuit board tends increase. Thus, there is strong demand for improving the mounting density of electronic components.

One of the proposed answers to the demand is to embed electronic components in an electronic circuit board. One of the many electronic components mounted on an electronic circuit board is a usual laminated ceramic capacitor. However, when the laminated ceramic capacitor is embedded in an electronic circuit board, the thickness of the laminated ceramic capacitor and brittleness as a ceramic property cause the problem of producing, by the stress generated in an embedding process, cracks in the laminated ceramic capacitor or deformation in a portion of the electronic circuit board where the laminated ceramic capacitor is embedded.

It is difficult to resolve the problem even by a usual laminated ceramic capacitor having a very small shape. Therefore, a lower-profile capacitor than the laminated ceramic capacitor is required as a capacitor for embedding in an electronic circuit board. A thin-film capacitor is generally known as a low-profile capacitor.

Thin-film capacitors are widely used for decoupling capacitors as small high-performance electronic components. Therefore, in addition to high dielectric constant and high breakdown voltage, a small change in capacitance with temperature over a wide temperature range of −55° C. to 125° C. in an operating atmosphere is required because the temperature is increased by heat generated from electronic components with increasing mounting density.

$(Ba_{1-x}Ca_x)_z(Ti_{1-y}Zr_y)O_3$ (hereinafter abbreviated as "BCTZ") is generally known as a material having a high dielectric constant (Japanese Unexamined Patent Application Publication No. 2005-22890).

Japanese Unexamined Patent Application Publication No. 2000-173349 discloses a technique for the dielectric constant and breakdown voltage of a BCTZ thin film. However, a change in capacitance with temperature is not described, and a manufacturing method is limited.

SUMMARY OF THE INVENTION

Accordingly, the present invention has been achieved in consideration of the above-described situation, and it is an object of the present invention to provide a dielectric film exhibiting a small temperature coefficient of capacitance while maintaining a high dielectric constant and also provide a dielectric element including the dielectric film.

In order to achieve the object, the present invention provides a dielectric film containing as a main component a dielectric composition represented by the general formula $(Ba_{1-x}Ca_x)_z(Ti_{1-y}Zr_y)O_3$ wherein $0.001 \leq x \leq 0.400$, $0.001 \leq y \leq 0.400$, and $0.900 \leq z \leq 0.995$. In an X-ray diffraction pattern of the dielectric composition, the dielectric composition has the relation $0.00° \leq 2\theta_c - 2\theta_t < 0.20°$ between (001) plane diffraction peak position $2\theta_t$ of a tetragonal structure represented by the general formula and (100) plane diffraction peak position $2\theta_c$ of a cubic structure represented by the general formula.

When x and y in the general formula $(Ba_{1-x}Ca_x)_z(Ti_{1-y}Zr_y)O_3$ are within the respective ranges described above, there is a function that high ferroelectricity can be maintained. As a result, a high dielectric constant can be obtained. In addition, when in an X-ray diffraction pattern of the dielectric composition, a crystal phase of the dielectric film has the relation $0.00° \leq 2\theta_c - 2\theta_t < 0.20°$ between the (001) plane diffraction peak position $2\theta_t$ of a tetragonal structure represented by the general formula and the (100) plane diffraction peak position $2\theta_c$ of a cubic structure represented by the general formula, a rapid phase transition does not occur within a temperature range of room temperature or more, and thus the a small temperature coefficient of capacitance can be obtained. Further, with z within the range above described, there is the function of preventing cracks and suppressing abnormal grain growth. As a result, a film density after annealing is increased, thereby exhibiting good electric characteristics.

In addition, when x and y of the general formula are within the ranges of $0.001 \leq x \leq 0.100$ and $0.001 \leq y \leq 0.100$, respectively, there is the effect of preventing decrease in Ti ion polarization contributing to the dielectric constant, and consequently a high dielectric constant is maintained.

In the present invention, the dielectric film preferably contains as sub-components V2O5 and at least one of MnO and CuO. Also, the total content of MnO and CuO as the sub-components is more preferably 0.010 mol to 1.000 mol relative to 100 mol of the main component in the dielectric film, and the content of $V_2O_5$ is more preferably 0.050 mol to 1.000 mol.

The sub-components contained have the function of facilitating the presence of $V_2O_5$ at grain boundaries in the dielectric film. As a result, the effect of improving the breakdown voltage can be achieved.

In addition, a dielectric element including the dielectric film according to the present invention and an electrode has high capacitance and a small temperature coefficient of capacitance.

The present invention can provide a dielectric film exhibiting a small temperature coefficient of capacitance while maintaining a high dielectric constant and also provide a dielectric element including the dielectric film.

DESCRIPTION OF THE PREFERRED EMBODIMENTS

An embodiment of the present invention is described below based on the drawings.

<Thin-Film Capacitor 10>

Figure 1:
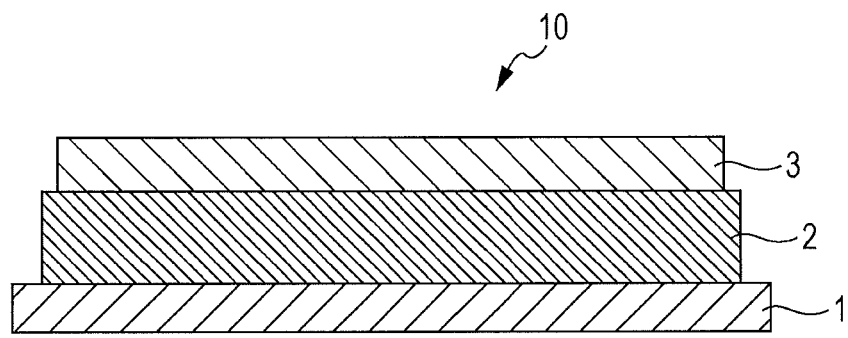
FIG. 1 is a cross-sectional view of a thin-film capacitor according to an embodiment of the present invention.

As shown in FIG. 1, a thin-film capacitor 10 according to an embodiment includes a lower electrode 1, an upper electrode structure 3 provided on the lower electrode 1, and a dielectric film 2 provided between the lower electrode 1 and the upper electrode structure 3. The shape of the thin-film capacitor 10 is not particularly limited and may be any desired size.

<Lower Electrode 1>

The lower electrode 1 may be composed of a base metal or a noble metal and is preferably composed of Cu or Ni and particularly preferably Ni. In view of lower cost of Ni than a noble metal, Ni is preferred. The purity of Ni constituting the lower electrode 1 is preferably as high as possible and preferably 99.99% by mass or more.

The thickness of the lower electrode 1 can be easily changed by polishing or the like, and thus the total thickness of the thin-film capacitor can be arbitrarily changed. A metal plate capable of achieving thinning of the thin-film capacitor is preferred, but a metal thin film formed on a substrate of Si, glass, ceramic, or the like may be used. Like in the metal plate, when a metal thin film is formed on a substrate of Si, glass, ceramic, or the like, a treatment of previously thinning the substrate before the formation of a metal thin film or thinning after the formation is required according to purpose. When the lower electrode 1 includes a metal plate, the thickness of the lower electrode 1 is preferably 5 µm to 100 µm and more preferably 20 µm to 70 µm. When the lower electrode 1 has a thickness of less than 5 µm, the lower electrode 1 tends to be difficult to handle during manufacture of the thin-film capacitor 10. When the lower electrode 1 includes a metal thin film formed on a substrate, a material used for forming the lower electrode 1 is not particularly limited as long as it has conductivity. The lower electrode 1 can be formed by using a metal such as platinum (Pt), ruthenium (Ru), rhodium (Rh), palladium (Pd), iridium (Ir), gold (Au), silver (Ag), copper (Cu), nickel (Ni), or the like. In view of cost and dielectric loss, Cu and Ni are preferred. The thickness of the metal thin film is not particularly limited as long as the metal thin film can function as one of the electrodes of the thin-film capacitor. The thickness of the metal thin film is preferably 50 nm or more, and the thickness of the substrate is preferably 5 µm to 100 µm. In order to improve adhesion between the substrate and the metal thin film, an adhesive layer may be formed on the substrate before the metal thin film is formed on the substrate. A material used for forming the adhesive layer is not particularly limited as long as it bonds the substrate, the metal thin film, and the dielectric film 2. For example, the adhesive layer can be formed by using an oxide of titanium (Ti) or chromium (Cr).

<Dielectric Film 2>

The dielectric film contains, as a main component, a dielectric composition represented by the general formula $(Ba_{1-x}Ca_x)_z(Ti_{1-y}Zr_y)O_3$ wherein $0.001 \leq x \leq 0.400$, $0.001 \leq y \leq 0.400$, and $0.900 \leq z < 0.995$, and in an X-ray diffraction pattern of the dielectric composition, the dielectric composition has the relation $0.00° \leq 2\theta_c - 2\theta_t < 0.20°$ between the (001) plane diffraction peak position $2\theta_t$ of a tetragonal structure represented by the general formula and the (100) plane diffraction peak position $2\theta_c$ of a cubic structure represented by the general formula. The main component represents a compound contained at a content of 50 mol % or more in the dielectric film.

When x and y are within the respective ranges described above, a small temperature coefficient of capacitance can be obtained while a dielectric constant is maintained high. On the other hand, when x and y out of the respective ranges, the dielectric constant or the temperature coefficient of capacitance is degraded. In addition, when z is less than 0.900, abnormal grain growth occurs, and thus cracks or voids occur in the dielectric film, thereby easily causing short circuit. When z is 0.995 or more, the film density after annealing is decreased, thereby failing to achieve desired characteristics. In addition, in an X-ray diffraction pattern of the dielectric composition measured by using a Cu-Kα line as an X-ray source, when the dielectric film has the relation $0.00° \leq 2\theta_c - 2\theta_t < 0.20°$ between the (001) plane diffraction peak position $2\theta_t$ of a tetragonal structure represented by the general formula and the (100) plane diffraction peak position $2\theta_c$ of a cubic structure represented by the general formula, good temperature coefficient can be obtained, thereby complying with the X7S standard of EIA standard. The (001) plane of a tetragonal structure represented by the general formula corresponds to a (001) plane of tetragonal barium titanate, and the (100) plane of a cubic structure represented by the general formula corresponds to a (100) plane of cubic barium titanate.

Figure 2:
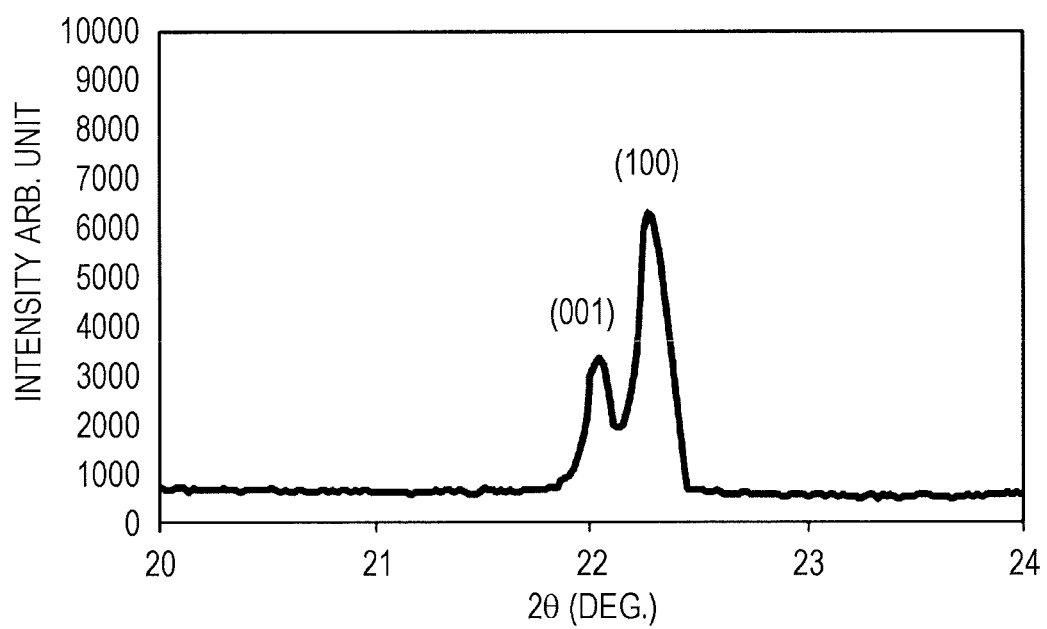
FIG. 2 is an X-ray diffraction pattern when $2\theta_c - 2\theta_t < 0.2°$.
Figure 3:
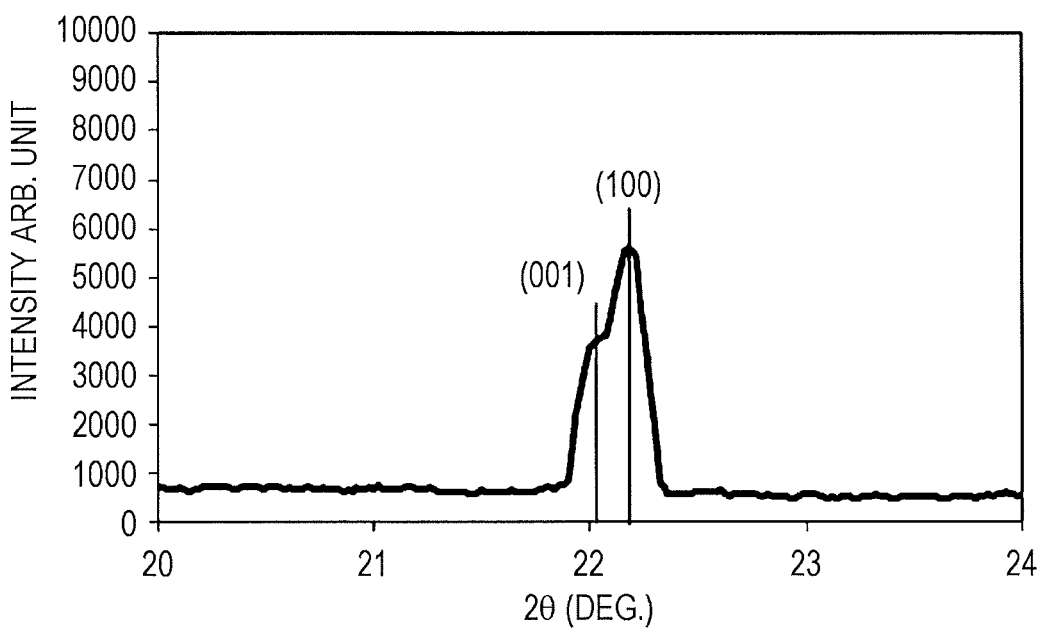
FIG. 3 is an X-ray diffraction pattern when $0.00° \leq 2\theta_c - 2\theta_t < 0.20°$.
Figure 4:
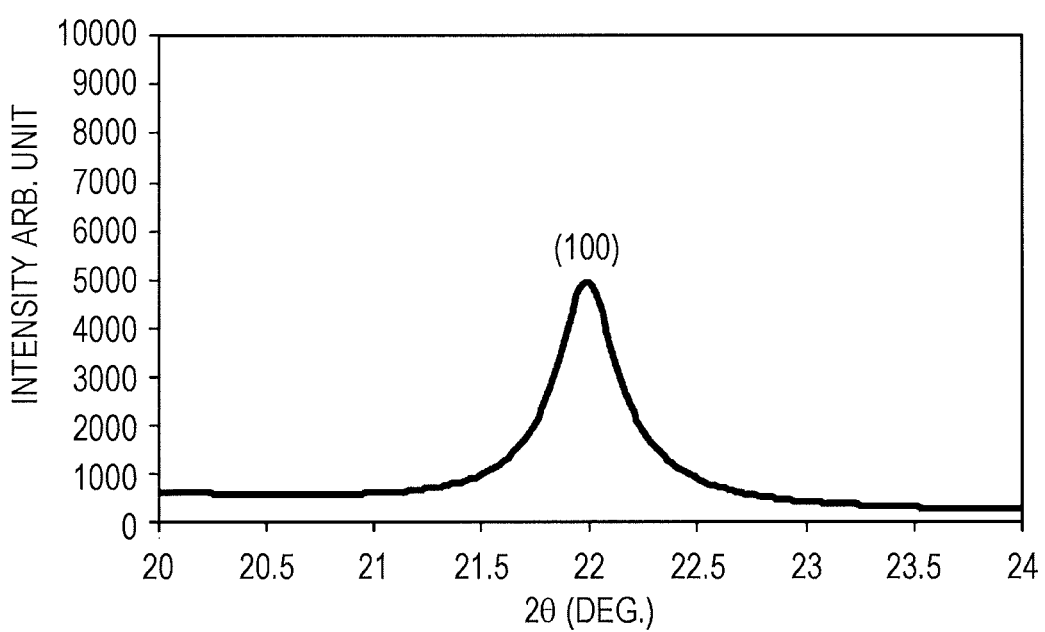
FIG. 4 is an X-ray diffraction pattern when $2\theta_c - 2\theta_t = 0°$.

The X-ray diffraction peak positions of the dielectric film were subjected to profile fitting using Rigaku PDXL2. FIG. 2 shows X-ray diffraction peaks when $2\theta_c - 2\theta_t = 0.20°$, and FIGS. 3 and 4 each show X-ray diffraction peaks when $0.00° \leq 2\theta_c - 2\theta_t < 0.20°$. With small anisotropy, as shown in FIG. 3, the (001) plane diffraction peak overlaps the (100) plane diffraction peak. Without anisotropy, as shown in FIG. 4, only the (100) plane diffraction peak appears without the (001) plane diffraction peak, and thus $2\theta_c - 2\theta_t = 0.00°$.

Figure 5:
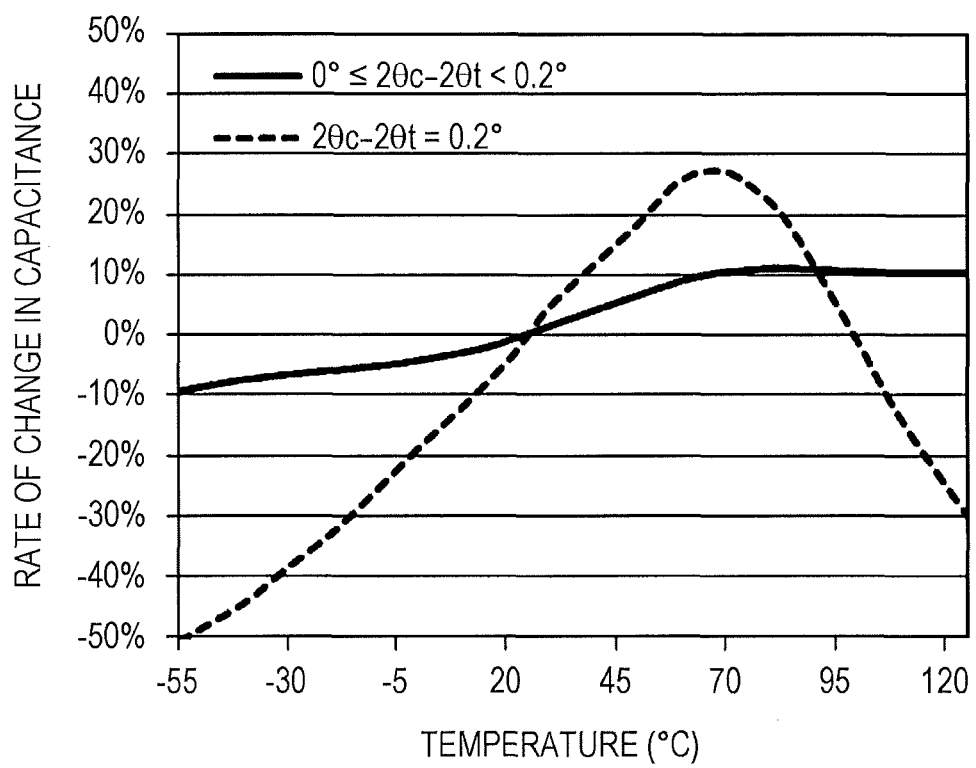
FIG. 5 is a graph showing a rate of change in capacitance with temperature.

FIG. 5 a graph showing a rate of change in capacitance with temperature. FIG. 5 shows comparison of the relation $2\theta_c - 2\theta_t = 0.20°$ (dotted line) with the relation $0.00° \leq 2\theta_c - 2\theta_t < 0.20°$ (solid line) between the (001) plane diffraction peak position $2\theta_t$ of a tetragonal structure represented by the general formula $(Ba_{1-x}Ca_x)(Ti_{1-y}Zr_y)O_3$ and the (100) plane diffraction peak position $2\theta_c$ of a cubic structure represented by the general formula in an X-ray diffraction pattern of the dielectric film according to the embodiment. When a difference between the diffraction peak positions of the dielectric film is $0.00° \leq 2\theta_c - 2\theta_t < 0.20°$, rapid phase transition does not occur within a temperature range of −55° C. to 125° C., and thus capacitance does not rapidly change with a temperature change. On the other hand, when a difference $2\theta_c - 2\theta_t$ between the diffraction peak positions of the dielectric film is larger than 0.20°, as shown in FIG. 5, a phase transition point is present at 50° C. to 100° C. The capacitance rapidly increases within the temperature range where the phase transition point is present, and thus at a reference temperature of 25° C., a rate of change in capacitance is +20% or more. In addition, a rapid decrease in capacitance occurs at a temperature equal to or higher than the phase transition point, and thus a rate of change in capacitance at 25° C. with temperature is −20% to −50%, or a more rapid change is observed. On the other hand, in the embodiment of the present invention in which the difference between the diffraction peak positions is $0.00° \leq 2\theta_c - 2\theta_t < 0.20°$, a rate of change in capacitance at 25° C. is within ±20%.

In addition, x and y of the general formula are preferably within the ranges of $0.001 \leq x \leq 0.100$ and $0.001 \leq y \leq 0.100$, respectively. When x and Y are within this range, there is the effect of preventing decrease in Ti ion polarization contributing to the dielectric constant, resulting in a higher dielectric constant.

The dielectric film preferably contains as sub-components V2O5 and at least one of MnO and CuO. The sub-components contained facilitate the presence of $V_2O_5$ at grain boundaries in the dielectric film. As a result, the effect of improving the breakdown voltage can be achieved.

The total content of MnO and CuO as the sub-components is ore preferably 0.010 mol to 1.000 mol relative to 100 mol of the main component in the dielectric film, and the content of $V_2O_5$ is more preferably 0.050 mol to 1.000 mol. When the contents of the sub-components within these ranges, a higher dielectric constant can be obtained.

The dielectric film according to the embodiment may further contain another component, for example, a transition element, a rare earth element, or the like.

The thickness of the dielectric film 2 may be properly determined according to application and is, for example, about 10 nm to 1000 nm. When the thickness of the dielectric film 2 is 1000 nm or more, brittleness of ceramics becomes remarked, and thus cracks may occur in the dielectric film during production of the dielectric film or in an embedding process. Further, in order to improve the capacitance of a capacitor per mounting area and the temperature coefficient of capacitance, the thickness of the dielectric film 2 is more preferably 50 nm to 1000 nm.

The average grain size calculated from a surface of the dielectric film is preferably 10 nm to 1500 nm. With the average grain size exceeding 1500 nm, a tetragonal structure is easily formed. The average grain size is more preferably 100 nm to 1300 nm. Within this range, a small temperature coefficient of capacitance can be obtained while the dielectric constant is maintained higher.

The shape of the dielectric film according to the embodiment is not particularly limited.

<Upper Electrode Structure 3>

In the embodiment, the thin-film capacitor 10 includes the upper electrode structure 3 disposed on the surface of the dielectric film 2 and functioning as the other electrode of the thin-film capacitor 10. A material used for forming the upper electrode structure 3 is not particularly limited as long as it has conductivity, and the upper electrode structure 3 can be formed by using the same material as the lower electrode 1. Further, an electrode thin film serving as the upper electrode structure 3 can be formed at room temperature, and thus the thin film of the upper electrode structure 3 can also be formed by using a base metal, such as iron (Fe), nickel (Ni), copper (Cu), or the like, or an alloy such as tungsten silicide (WSi), molybdenum silicide (MoSi), or the like. The thickness of the upper electrode structure 3 is not particularly limited as long as it functions as the other electrode of the thin-film capacitor and can be determined to, for example, 10 nm to 10000 nm.

Next, a method for manufacturing the thin-film capacitor 10 according to the embodiment is described.

First, a Ni plate is prepared as the lower electrode 1.

Next, a precursor of the dielectric film 2 is formed on the lower electrode 1. The precursor of the dielectric film 2 can be formed by a thin film forming method such as a vacuum vapor deposition method, a sputtering method, a pulsed laser deposition method (PLD method), a metal-organic chemical vapor deposition method (MOCVD method), a metal organic decomposition method (MOD method), a chemical solution deposition method such as a sol-gel method, or the like.

In the sputtering method, the precursor of the dielectric film 2 is formed on the lower electrode 1 by using a target having a desired composition. Preferred conditions include an atmosphere argon (Ar)/oxygen ($O_2$) ratio of 1/1 to 5/1, a pressure of 0.01 Pa to 10 Pa, a high-frequency power of 100 W to 300 W, and a substrate temperature of room temperature to 800° C.

The resultant precursor of the dielectric film 2 is annealed. Annealing is preferably performed at a heating rate of 50° C./hour to 8000° C./hour, more preferably 200° C./hour to 8000° C./hour, and holding temperature of 1000° C. or less, more preferably 800° C. to 950° C. Holding time for annealing is preferably 0.05 hours to 2.0 hours, more preferably 0.1 hours to 2.0 hours, and particularly preferably 0.5 hours to 2.0 hours. With the holding temperature and the holding time within these respective ranges, the small temperature coefficient of capacitance can be obtained while the dielectric constant is maintained high. In addition, the occurrence of cracks and peeling in the dielectric film can be prevented.

An annealing atmosphere preferably has an oxygen partial pressure of $10^{-14}$ MPa to $10^{-10}$ MPa. This is because annealing in a reducing atmosphere causes a lattice defect, and, in an X-ray diffraction pattern, a relation between the (001) plane diffraction peak position $2\theta_t$ of a tetragonal structure represented by the general formula and the (100) plane diffraction peak position $2\theta_c$ of a cubic structure represented by the general formula is considered to be $0.00° \leq 2\theta_c - 2\theta_t < 0.20°$. Also, diffusion proceeds due to the lattice defect, and crystallization can be realized by a low temperature of 1000° C. or less, thereby producing a grain diameter of 1500 nm or less. It is thus considered that crystallization proceeds while maintaining a low-anisotropy state ($2\theta_c - 2\theta_t < 0.20°$).

Next, a Pt thin film is formed as the upper electrode structure 3 on the resultant dielectric film 2 by, for example, a sputtering method, thereby producing the thin-film capacitor 10.

Although, in the embodiment described above, the thin-film capacitor is described as an example of a dielectric element according to the present invention, a dielectric element according to the present invention is not limited to the thin-film capacitor and may be any dielectric element including the dielectric film.

Although the embodiment of the present invention is described above, the present invention is not limited to the embodiment described above, and various modifications can be made without deviating the gist of the present invention.

EXAMPLES

The present invention is described in further detail below based on examples, but the present invention is not limited to these examples.

Examples 1 to 17 and Comparative Examples 1 to 6

A Ni plate having a thickness of 50 μm was prepared as a lower electrode. The Ni plate had dimensions of 10 mm in length and 10 mm in width.

A target for sputtering required for forming a dielectric film containing a main component represented by the general formula $(Ba_{1-x}Ca_x)_z(Ti_{1-y}Zr_y)O_3$ was produced by a solid phase method. The mixing ratios of raw material powders of $BaCO_3$, $CaCO_3$, $TiO_2$, and $ZrO_2$ in the target were adjusted so as to obtain each of the dielectric film compositions shown in Table 1.

Next, the raw material powders were wet-mixed in a ball mill for 20 hours using water as a solvent, and the resultant mixed powder was dried at 100° C.

The mixed powder was pressed to form a molded body. The molding conditions included a pressure of 100 Pa, a temperature or 25° C., and a pressing time of 3 minutes.

Then, the molded body was sintered at holding temperature of 1300° C. for a temperature holding time of 10 hours in an air atmosphere.

Then, the resultant sintered body was processed into a diameter of 200 mm and a thickness of 6 mm by using a surface grinder and a cylindrical grinding machine to produce the target for sputtering required for forming the dielectric film.

In order to form the dielectric film on the lower electrode, film deposition was performed by a sputtering method using the target under conditions including an atmosphere argon (Ar)/oxygen ($O_2$) ratio of 3/1, a pressure of 0.8 Pa, a high-frequency power of 200 W, and a substrate temperature of room temperature. Then, annealing was performed under conditions described below to produce the dielectric film. The thickness of the dielectric film was 400 nm.

The annealing conditions included a heating rate of 600° C./hour, holding temperature of 850° C. to 950° C., a temperature holding time of 1.0 hour, and a (wet $N_2+H_2$) mixed gas atmosphere (oxygen partial pressure of $3\times10^{-11}$ MPa).

Then, a Pt thin film was formed as the upper electrode structure on the dielectric film by a sputtering method using a mask so that the diameter was 5 mm and the thickness was 50 nm, thereby producing samples of Examples 1 to 17 and Comparative Examples 1 to 6 shown in Table 1.

The resultant thin-film capacitor samples were evaluated with respect to dielectric constant, temperature coefficient of capacitance, breakdown voltage, dielectric film composition ratio, and crystal phase by methods described below.

<Dielectric Constant>

The dielectric constant was calculated from capacitance C measured for each of the thin-film capacitor samples at a reference temperature of 25° C. by using a digital LCR meter (4274A manufactured by YHP Company) under the conditions including a frequency of 1 kHz, an input signal level (measurement voltage) of 100 mVrms (no unit). The dielectric constant is preferably as high as possible, and in the examples, a dielectric constant of 1000 or more was evaluated as "good" and a dielectric constant of 1400 or more was evaluated as "particularly good".

<Temperature Coefficient of Capacitance TCC>

The capacitance of each of the thin-film capacitor samples was measured at −55° C. to 125° C., a frequency of 1 kHz, an input signal level (measurement voltage) of 1.0 Vrms. At a reference temperature of 25° C., a temperature coefficient within ±22% at −55° C. to 125° C. was evaluated as "good". The temperature coefficient of capacitance TCC (%) was calculated by an equation (1) below. In the equation (1), C represents capacitance at each temperature, and $C_{25}$ represents capacitance at 25° C.

$$TCC\ (1\ kHz)=\{(C-C_{25})/C_{25}\}\times 100 \quad (1)$$

<Breakdown Voltage>

A direct-current voltage was applied to each of the thin-film capacitor samples at a voltage increase rate of 1 V/second starting from 0 V. A voltage at which a current of 10 mA or more flowed was regarded as breakdown voltage. In the examples, the evaluation was made for 10 samples, and a sample having an average breakdown voltage of 40 kV/mm or more was determined as "good".

<Composition Ratio of Dielectric Film>

The composition of the produced dielectric film was measured for all samples by X-ray fluorescence analysis (XRF). As a result, the compositions shown in Table 1 were confirmed.

<Crystal Phase of Dielectric Film>

The dielectric film was measured by X-ray diffraction (parallel method) to obtain a diffraction pattern. For the X-ray diffraction pattern, X-ray diffraction peak positions were determined by, using Rigaku PDXL2, profile fitting of the (001) plane diffraction peak position $2\theta_t$ (near 22.000) of a BCTZ tetragonal structure and the (100) plane diffraction peak position $2\theta_c$ (near 22.20°) of a BCTZ cubic structure. A Cu-Kα line was used as an X-ray source, and measurement was performed under conditions including a voltage of 45 kV within a 2θ range of 20.00° to 70.00°.

The measurement results are shown in Table 1. In Table 1, "-" represents an adding amount of 0.

TABLE 1

| Example/ Comparative Example | $(Ba_{1-x}Ca_x)_z$ $(Ti_{1-y}Zr_y)O_3$ | | | Relative to 100 mol main component (mol) | | | Production method | Annealing temperature (° C.) | Dielectric constant (-) | TCC @−55° C. | TCC @125° C. | Breakdown voltage (kV/mm) | $2\theta_c-2\theta_t$ (°) | Determination |
|---|---|---|---|---|---|---|---|---|---|---|---|---|---|---|
| | x | y | z | MnO | CuO | $V_2O_3$ | | | | | | | | |
| Comparative Example 1 | 0.040 | 0.060 | 0.890 | — | — | — | Sputtering method | 900 | 715 | −10.1% | 9.7% | 50 | 0.02 | X |
| Example 1 | 0.040 | 0.060 | 0.900 | — | — | — | Sputtering method | 900 | 1223 | −12.8% | 7.0% | 50 | 0.02 | ○ |
| Example 2 | 0.040 | 0.060 | 0.950 | — | — | — | Sputtering method | 900 | 1193 | −13.2% | 7.9% | 50 | 0.04 | ○ |
| Example 3 | 0.040 | 0.060 | 0.991 | — | — | — | Sputtering method | 900 | 1102 | −16.0% | 6.1% | 40 | 0.08 | ○ |
| Comparative Example 2 | 0.040 | 0.060 | 0.995 | — | — | — | Sputtering method | 900 | 742 | −19.1% | 6.1% | 40 | 0.13 | X |
| Comparative Example 3 | 0.000 | 0.060 | 0.950 | — | — | — | Sputtering method | 950 | Unmeasurable | Unmeasurable | Unmeasurable | Unmeasurable | 0.07 | X |
| Example 4 | 0.001 | 0.060 | 0.950 | — | — | — | Sputtering method | 950 | 1105 | −10.3% | 10.0% | 40 | 0.07 | ○ |
| Example 5 | 0.010 | 0.060 | 0.950 | — | — | — | Sputtering method | 950 | 1129 | −9.8% | 7.7% | 40 | 0.06 | ○ |
| Example 6 | 0.100 | 0.060 | 0.950 | — | — | — | Sputtering method | 950 | 1140 | −11.3% | 8.1% | 50 | 0.05 | ○ |
| Example 7 | 0.200 | 0.060 | 0.950 | — | — | — | Sputtering method | 950 | 1048 | −12.1% | 7.9% | 50 | 0.03 | ○ |
| Example 8 | 0.300 | 0.060 | 0.950 | — | — | — | Sputtering method | 950 | 1023 | −12.8% | 7.5% | 50 | 0.01 | ○ |
| Example 9 | 0.400 | 0.060 | 0.950 | — | — | — | Sputtering method | 950 | 1003 | −13.0% | 5.1% | 50 | 0.01 | ○ |
| Comparative Example 4 | 0.410 | 0.060 | 0.950 | — | — | — | Sputtering method | 950 | 979 | −6.6% | 4.5% | 50 | 0.00 | X |

TABLE 1-continued

| Example/Comparative Example | $(Ba_{1-x}Ca_x)_z(Ti_{1-y}Zr_y)O_3$ x | y | z | Relative to 100 mol main component (mol) MnO | CuO | $V_2O_3$ | Production method | Annealing temperature (°C.) | Dielectric constant (—) | TCC @−55° C. | TCC @125° C. | Breakdown voltage (kV/mm) | $2\theta_c-2\theta_t$ (°) | Determination |
|---|---|---|---|---|---|---|---|---|---|---|---|---|---|---|
| Comparative Example 5 | 0.040 | 0.000 | 0.950 | — | — | — | Sputtering method | 950 | 560 | −14.5% | 2.0% | 40 | 0.05 | X |
| Example 10 | 0.040 | 0.001 | 0.950 | — | — | — | Sputtering method | 950 | 1115 | −14.3% | 2.3% | 40 | 0.04 | ○ |
| Example 11 | 0.040 | 0.050 | 0.950 | — | — | — | Sputtering method | 950 | 1189 | −13.9% | 5.8% | 50 | 0.03 | ○ |
| Example 12 | 0.040 | 0.100 | 0.950 | — | — | — | Sputtering method | 950 | 1274 | −12.8% | 6.9% | 50 | 0.01 | ○ |
| Example 13 | 0.040 | 0.200 | 0.950 | — | — | — | Sputtering method | 950 | 1032 | −11.5% | 7.8% | 40 | 0.00 | ○ |
| Example 14 | 0.040 | 0.300 | 0.950 | — | — | — | Sputtering method | 950 | 1098 | −10.1% | 8.3% | 40 | 0.02 | ○ |
| Example 15 | 0.040 | 0.400 | 0.950 | — | — | — | Sputtering method | 950 | 1075 | −9.8% | 8.8% | 50 | 0.01 | ○ |
| Comparative Example 6 | 0.040 | 0.410 | 0.950 | — | — | — | Sputtering method | 950 | 887 | −10.2% | 8.7% | 50 | 0.00 | X |
| Example 16 | 0.005 | 0.001 | 0.900 | — | — | — | Sputtering method | 900 | 1227 | −10.0% | −18.6% | 50 | 0.18 | ○ |
| Example 17 | 0.400 | 0.400 | 0.991 | — | — | — | Sputtering method | 950 | 1050 | −10.3% | 9.0% | 50 | 0.00 | ○ |
| Example 18 | 0.040 | 0.060 | 0.950 | — | — | — | PLD method | 950 | 1106 | −10.9% | 8.4% | 40 | 0.04 | ○ |
| Example 19 | 0.040 | 0.060 | 0.950 | 0.010 | — | 0.100 | Sputtering method | 950 | 1502 | −9.8% | 6.7% | 70 | 0.04 | ⊙ |
| Example 20 | 0.040 | 0.060 | 0.950 | 0.200 | — | 0.100 | Sputtering method | 950 | 2729 | −13.4% | 10.4% | 80 | 0.04 | ⊙ |
| Example 21 | 0.040 | 0.060 | 0.950 | 0.600 | — | 0.100 | Sputtering method | 950 | 1680 | −8.0% | 5.6% | 80 | 0.04 | ⊙ |
| Example 22 | 0.040 | 0.060 | 0.950 | 1.000 | — | 0.100 | Sputtering method | 950 | 1400 | −6.7% | 4.9% | 100 | 0.04 | ⊙ |
| Example 23 | 0.040 | 0.060 | 0.950 | 1.500 | — | 0.100 | Sputtering method | 950 | 1250 | −15.4% | 13.6% | 80 | 0.04 | ○ |
| Example 24 | 0.040 | 0.060 | 0.950 | — | 0.200 | 0.100 | Sputtering method | 950 | 2400 | −12.5% | 11.7% | 80 | 0.04 | ⊙ |
| Example 25 | 0.040 | 0.060 | 0.950 | 0.100 | 0.100 | 0.100 | Sputtering method | 950 | 1920 | −13.3% | 9.4% | 80 | 0.03 | ⊙ |
| Example 26 | 0.040 | 0.060 | 0.950 | 0.200 | — | — | Sputtering method | 950 | 1188 | −11.3% | 8.9% | 40 | 0.04 | ○ |
| Example 27 | 0.040 | 0.060 | 0.950 | — | 0.200 | — | Sputtering method | 950 | 1081 | −12.9% | 9.4% | 40 | 0.04 | ○ |
| Example 28 | 0.040 | 0.060 | 0.950 | — | — | 0.100 | Sputtering method | 950 | 1173 | −11.4% | −1.8% | 40 | 0.03 | ○ |
| Example 29 | 0.040 | 0.060 | 0.950 | — | 0.200 | 0.010 | Sputtering method | 950 | 1192 | −10.4% | 9.0% | 60 | 0.03 | ○ |
| Example 30 | 0.040 | 0.060 | 0.950 | — | 0.200 | 0.050 | Sputtering method | 950 | 1412 | −13.1% | −5.6% | 70 | 0.06 | ⊙ |
| Example 31 | 0.040 | 0.060 | 0.950 | — | 0.200 | 1.000 | Sputtering method | 950 | 1453 | −18.0% | −9.9% | 60 | 0.10 | ⊙ |
| Example 32 | 0.040 | 0.060 | 0.950 | — | 0.200 | 1.100 | Sputtering method | 950 | 1020 | −18.9% | −12.2% | 60 | 0.10 | ○ |
| Example 33 | 0.040 | 0.060 | 0.950 | 1.000 | — | 1.000 | Sputtering method | 950 | 1403 | −18.9% | −14.3% | 50 | 0.09 | ⊙ |
| Comparative Example 7 | 0.040 | 0.060 | 0.950 | — | — | — | Sputtering method | 1250 | 3159 | −49.9% | −29.4% | 40 | 0.20 | X |

Example 18

First, a target for PLD required for forming a dielectric film containing a main component represented by the general formula $(Ba_{1-x}Ca_x)_z(Ti_{1-y}Zr_y)O_3$ was produced by the same target forming method as in Example 1. The mixing ratios of raw material powders of $BaCO_3$, $CaCO_3$, $TiO_2$, and $ZrO_2$ in the target were adjusted so as to obtain the dielectric film composition shown in Table 1.

Next, the dielectric film was formed on a Ni plate by a PLD method using the PLD target under conditions including an atmosphere of oxygen, an oxygen partial pressure of 1 Pa, a pressure of 1 Pa, a laser power of 50 mV, and a substrate temperature of room temperature so that the thickness was 400 nm.

A sample of Example 18 was formed by the same method as in Example 1 except that the dielectric film was formed by the PLD method.

The resultant sample of Example 18 was evaluated by the same method as in Example 1. The results are shown in Table 1.

Examples 19 to 33

First, a target for sputtering required for forming a dielectric film containing a main component represented by the general formula $(Ba_{1-x}Ca_x)_z(Ti_{1-y}Zr_y)O_3$ was produced by the same solid phase method as in Example 1. The mixing ratios of raw material powders of $BaCO_3$, $CaCO_3$, $TiO_2$, $ZrO_2$, $V_2O_5$, MnO, and CuO in the target were adjusted so as to obtain each of the dielectric film compositions shown in Table 1.

The dielectric film was formed by the same method as in Example 1 except that $V_2O_5$, MnO, and CuO were added to the target.

The resultant samples of Examples 19 to 33 were evaluated by the same method as in Example 1. The results are shown in Table 1.

Comparative Example 7

First, a target for sputtering required for forming a dielectric film containing a main component represented by the general formula $(Ba_{1-x}Ca_x)_z(Ti_{1-y}Zr_y)O_3$ was produced by the same solid phase method as in Example 1. The mixing ratios of raw material powders of $BaCO_3$, $CaCO_3$, $TiO_2$, and $ZrO_2$ in the target were adjusted so as to obtain the dielectric film composition shown in Table 1.

The dielectric film was formed by the same method as in Example 1 except that the holding temperature as an annealing condition was 1250° C.

The resultant sample of Comparative Example 7 was evaluated by the same method as in Example 1. The results are shown in Table 1.

In addition, the average grain size of Comparative Example 7 was measured. A surface of the dielectric film of Comparative Example 7 was observed with SEM (scanning electron microscope) and a SEM photograph was taken. Further, grain boundaries were distinguished by image processing of the SEM photograph using a soft ware, and the area of each of the crystal grains was calculated. The grain size was calculated by converting the calculated area of each of the crystal grains into a circle equivalent diameter. The average value of the dielectric grain diameters was regarded as the average grain size. As a result of calculation of the grain size of 100 crystal grains in a surface of the dielectric film, the average grain size was 1560 nm.

Example 1 to Example 17

It can be confirmed by Table 1 that when the dielectric film contains as a main component a dielectric composition represented by the general formula $(Ba_{1-x}Ca_x)_z(Ti_{1-y}Zr_y)O_3$ wherein $0.001 \leq x \leq 0.400$, $0.001 \leq y \leq 0.400$, and $0.900 \leq z < 0.995$, and in an X-ray diffraction pattern of the dielectric composition, a crystal phase of the dielectric composition has the relation $0.00° \leq 2\theta_c - 2\theta_t < 0.20°$ between the (001) plane diffraction peak position $2\theta_t$ of a tetragonal structure represented by the general formula and the (100) plane diffraction peak position $2\theta_c$ of a cubic structure represented by the general formula, the a small temperature coefficient of capacitance (TCC=within ±22%) can be realized while a dielectric constant of 1000 or more is exhibited.

Example 1 to Example 6 and Example 10 to Example 12

It can be confirmed by Table 1 that when the dielectric film contains as a main component a dielectric composition represented by the general formula $(Ba_{1-x}Ca_x)_z(Ti_{1-y}Zr_y)O_3$ wherein $0.001 \leq x \leq 0.100$, $0.001 \leq y \leq 0.100$, and $0.900 \leq z < 0.995$, and in an X-ray diffraction pattern of the dielectric composition, a crystal phase of the dielectric composition has the relation $0.00° \leq 2\theta_c - 2\theta_t < 0.20°$ between the (001) plane diffraction peak position $2\theta_t$ of a tetragonal structure represented by the general formula and the (100) plane diffraction peak position $2\theta_c$ of a cubic structure represented by the general formula, the a small temperature coefficient of capacitance (TCC=within ±22%) can be realized while a particularly high dielectric constant of 1100 or more is exhibited.

Comparative Example 1 to Comparative Example 6

Table 1 indicates that when the dielectric film contains a main component represented by the general formula $(Ba_{1-x}Ca_x)_z(Ti_{1-y}Zr_y)O_3$ wherein any one of x, y, and z is out of the range of $0.001 \leq x \leq 0.400$, $0.001 \leq y \leq 0.400$, and $0.900 \leq z < 0.995$, both the dielectric constant and the temperature coefficient of capacitance cannot be satisfied.

Example 18

It can be confirmed by Table 1 that regardless of the thin film forming method, when a main component is a dielectric composition represented by the general formula $(Ba_{1-x}Ca_x)_z(Ti_{1-y}Zr_y)O_3$ wherein $0.001 \leq x \leq 0.400$, $0.001 \leq y \leq 0.400$, and $0.900 \leq z < 0.995$, and in an X-ray diffraction pattern of the dielectric composition, the dielectric composition has the relation $0.00° \leq 2\theta_c - 2\theta_t < 0.20°$ between the (001) plane diffraction peak position $2\theta_t$ of a tetragonal structure represented by the general formula and the (100) plane diffraction peak position $2\theta_c$ of a cubic structure represented by the general formula, the a small temperature coefficient of capacitance can be realized while a high dielectric constant is maintained.

Example 20, Example 24 and Example 25

It can be confirmed by Table 1 that when the dielectric film contains as a main component a dielectric composition represented by the general formula $(Ba_{1-x}Ca_x)_z(Ti_{1-y}Zr_y)O_3$ wherein $0.001 \leq x \leq 0.400$, $0.001 \leq y \leq 0.400$, and $0.900 \leq z < 0.995$, in an X-ray diffraction pattern of the dielectric composition, the dielectric composition has the relation $0.00° \leq 2\theta_c - 2\theta_t < 0.20°$ between the (001) plane diffraction peak position $2\theta_t$ of a tetragonal structure represented by the general formula and the (100) plane diffraction peak position $2\theta_c$ of a cubic structure represented by the general formula, and the dielectric film further contains as sub-components V2O5 and at least one of MnO and CuO, the a small temperature coefficient of capacitance and breakdown voltage can be realized while a high dielectric constant is maintained as compared with Examples 26 to 28 containing only the sub-components MnO, CuO, and $V_2O_5$, respectively.

Example 19 to Example 25 and Example 29 to Example 33

It can be confirmed by Table 1 that when the dielectric film contains as a main component a dielectric composition represented by the general formula $(Ba_{1-x}Ca_x)_z(Ti_{1-y}Zr_y)O_3$ wherein $0.001 \leq x \leq 0.400$, $0.001 \leq y \leq 0.400$, and $0.900 \leq z < 0.995$, in an X-ray diffraction pattern of the dielectric composition, the dielectric composition has the relation $0.00° \leq 2\theta_c - 2\theta_t < 0.20°$ between the (001) plane diffraction peak position $2\theta_t$ of a tetragonal structure represented by the general formula and the (100) plane diffraction peak position $2\theta_c$ of a cubic structure represented by the general formula, and the dielectric film further contains as sub-components MnO and CuO at a total content of 0.010 mol to 1.000 mol and $V_2O_5$ at a content of 0.050 mol to 1.000 mol, the a small temperature coefficient of capacitance and breakdown voltage can be realized while a higher dielectric constant is maintained.

Comparative Example 7

It can be confirmed by Table 1 that when a main component is a dielectric composition represented by the general formula $(Ba_{1-x}Ca_x)_z(Ti_{1-y}Zr_y)O_3$ wherein $0.001 \leq x \leq 0.400$, $0.001 \leq y \leq 0.400$, and $0.900 \leq z < 0.995$, but in an X-ray diffraction pattern of the dielectric composition, the dielectric composition does not have the relation $0.00° \leq 2\theta_c - 2\theta_t < 0.20°$ between the (001) plane diffraction peak position $2\theta_t$ of a tetragonal structure represented by the general formula and the (100) plane diffraction peak position $2\theta_c$ of a cubic structure represented by the general formula, both the high dielectric constant and the temperature coefficient of capacitance cannot be satisfied. It is considered that the average grain size of Comparative Example 7 exceeds 1500 nm, and thus the diffraction peak positions do not satisfy the relation $0.00° \leq 2\theta_c - 2\theta_t < 0.20°$.

As described above, the present invention relates to a dielectric element such as a thin-film capacitor or the like which includes a dielectric film, and the present invention can provide a dielectric film exhibiting a small temperature coefficient of capacitance while maintaining a high dielectric constant. Therefore, an attempt can be made to realize a small-size highly functional dielectric element such as a thin-film capacitor or the like which includes a dielectric film. The dielectric film and the dielectric element of the present invention can be used as, for example, an active element such as a transistor for an integrated circuit and the like.

What is claimed is:

1. A dielectric film comprising:
a dielectric composition as a main component, the dielectric composition being represented by the general formula $(Ba_{1-x}Ca_x)_z(Ti_{1-y}Zr_y)O_3$ wherein $0.001 \leq x \leq 0.400$, $0.001 \leq y \leq 0.400$, and $0.900 \leq z < 0.995$, and
sub-components $V_2O_5$ and at least one or more of MnO and CuO;
wherein in an X-ray diffraction pattern of the dielectric composition, the dielectric composition has the relation $0.00° \leq 2\theta_c - 2\theta_t < 0.20°$ between (001) plane diffraction peak position $2\theta_t$ of a tetragonal structure represented by the general formula and (100) plane diffraction peak position $2\theta_c$ of a cubic structure represented by the general formula.

2. The dielectric film according to claim 1, wherein x and y of the general formula are within the ranges of $0.001 \leq x \leq 0.100$ and $0.001 \leq y \leq 0.100$, respectively.

3. The dielectric film according to claim 1, wherein a total content of MnO and CuO as the sub-components is 0.010 mol to 1.000 mol relative to 100 mol of the main component in the dielectric film, and a content of $V_2O_5$ is 0.050 mol to 1.000 mol.

4. A dielectric element comprising:
the dielectric film according to claim 1; and
an electrode.

5. The dielectric film according to claim 2, wherein a total content of MnO and CuO as the sub-components is 0.010 mol to 1.000 mol relative to 100 mol of the main component in the dielectric film, and a content of $V_2O_5$ is 0.050 mol to 1.000 mol.

6. A dielectric element comprising:
the dielectric film according to claim 2; and an electrode.

7. A dielectric element comprising:
the dielectric film according to claim 3; and
an electrode.

8. A dielectric element comprising:
the dielectric film according to claim 5; and
an electrode.

* * * * *